Figure 3:
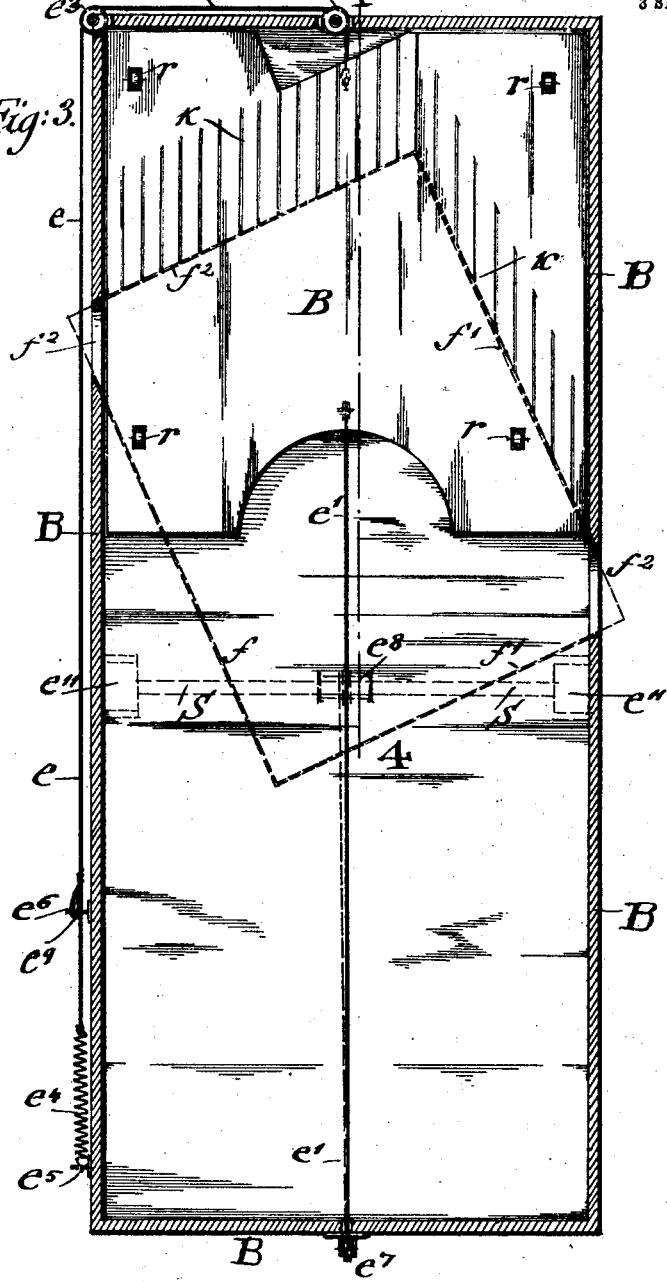

No. 772,688. PATENTED OCT. 18, 1904.
B. YORE.
MOLD FOR MAKING FRENCH ROLLS.
APPLICATION FILED MAR. 19, 1904.
NO MODEL. 3 SHEETS—SHEET 1.
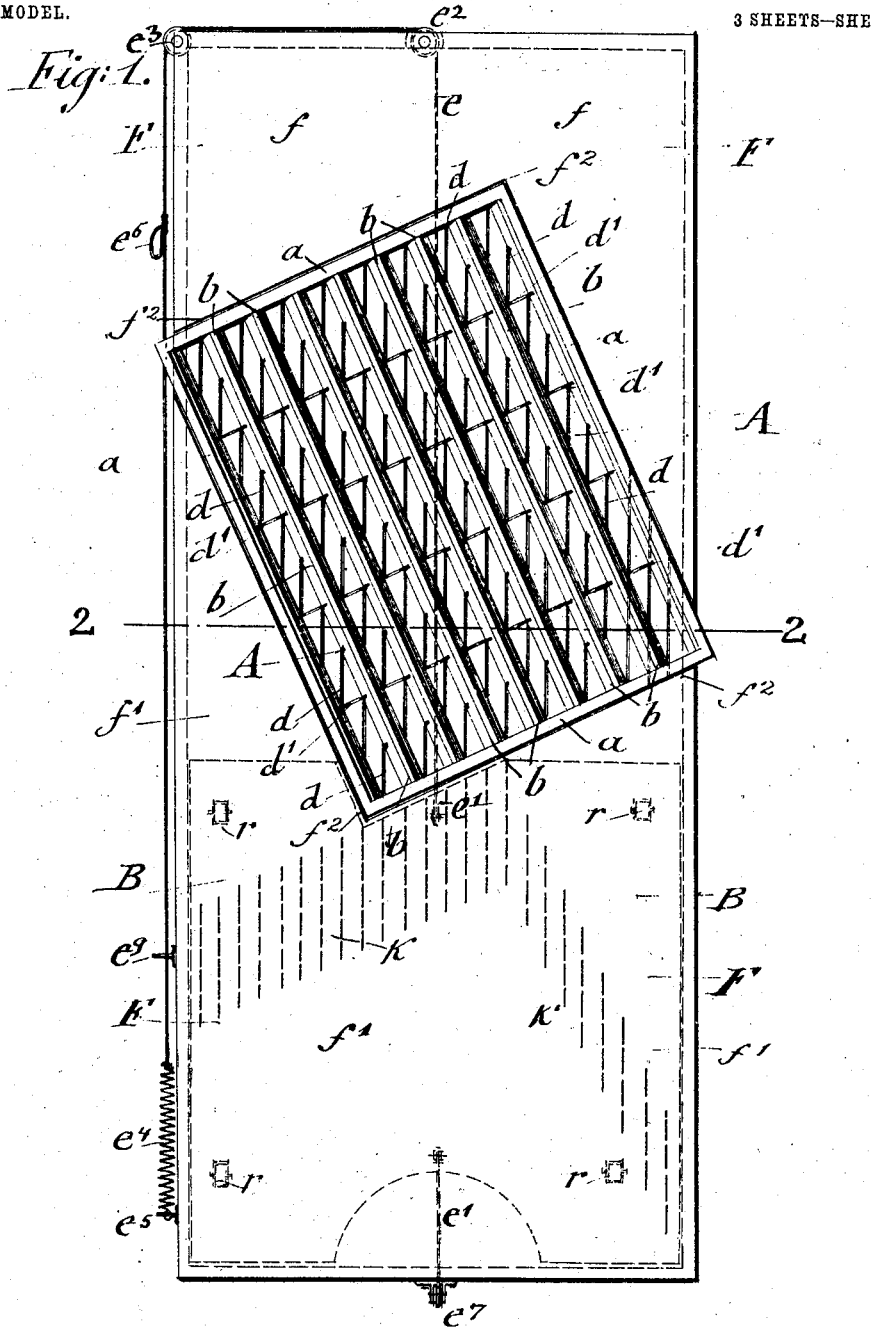
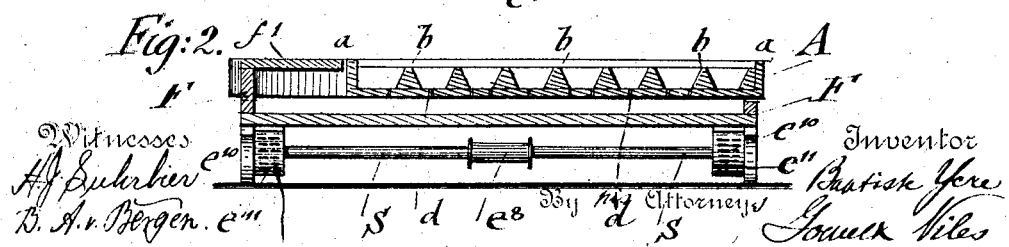

No. 772,688. PATENTED OCT. 18, 1904.
B. YORE.
MOLD FOR MAKING FRENCH ROLLS.
APPLICATION FILED MAR. 19, 1904.
NO MODEL. 3 SHEETS—SHEET 2.

Witnesses Inventor
B. Yore
By his Attorneys

No. 772,688. PATENTED OCT. 18, 1904.
B. YCRE.
MOLD FOR MAKING FRENCH ROLLS.
APPLICATION FILED MAR. 19, 1904.
NO MODEL. 3 SHEETS—SHEET 3.
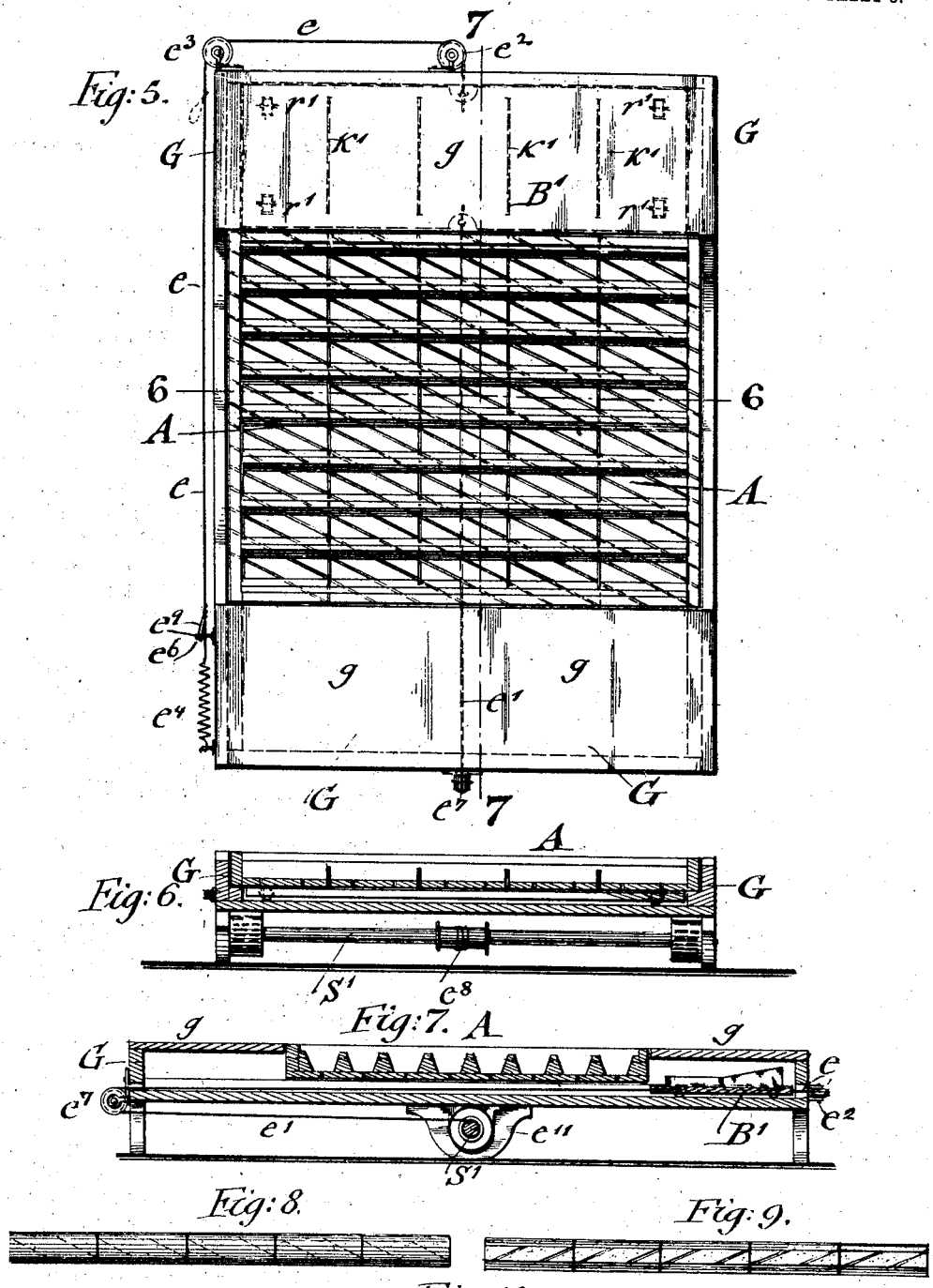

No. 772,688.  
Patented October 18, 1904.

UNITED STATES PATENT OFFICE.

BAPTISTE YCRE, OF NEW YORK, N. Y.

MOLD FOR MAKING FRENCH ROLLS.

SPECIFICATION forming part of Letters Patent No. 772,688, dated October 18, 1904.

Application filed March 19, 1904. Serial No. 198,881. (No model.)

*To all whom it may concern:*

Be it known that I, BAPTISTE YCRE, a citizen of the United States, residing in New York, borough of Manhattan, and State of New York, have invented certain new and useful Improvements in Molds for Making French Rolls, of which the following is a specification.

This invention relates to certain improvements in the mold for making French rolls for which Letters Patent were granted to me heretofore, No. 714,550, dated November 25, 1902.

In using the mold referred to the dough was rolled out or stretched to sufficient length and placed in the spaces between a number of rows of ribs located in the mold. The rolls of dough were then cut into as many pieces as there were rows of ribs by passing a knife from end to end in the spaces separating the rows of ribs. In this manner the pieces of rolled or stretched dough were quickly cut into pieces of uniform size corresponding to the rolls to be made. A peel that corresponds in size to the mold was then placed in position over the same, after which the mold and peel were reversed together, so that all the pieces of dough were dropped onto the peel, by which they are then transferred into the oven for baking. Before the transfer of the pieces of dough from the mold to the peel the top surfaces of the rolls were provided with inclined scratches for permitting the gases to escape during the baking operation and improve the appearance of the baked rolls. When a large number of rolls have to be baked during the day, this scratching of the pieces of dough and the cutting of the same in the molds takes up considerable time and delays the charging of the oven with the rolls for baking the same. In most French bakeries it is customary to bake four times a day, and it is therefore necessary to accomplish the making of the dough, the rolling it into longitudinal pieces, placing these pieces in the molds, scratching the surfaces of the individual pieces of dough, and cutting them transversely into the smaller pieces required for the rolls within a certain time, so as to produce the large number of rolls required.

The object of this invention is to furnish an improved mold for making French rolls by which the inclined scratchers on the surface of the pieces of dough and the transverse cutting off of the long pieces of dough into smaller pieces corresponding to the size of the rolls to be made is accomplished by mechanical means, so that less time is consumed in scratching the pieces, cutting them to the required size, and baking them; and for this purpose the invention consists of a mold for making French rolls which comprises a rectangular box of the required size, provided with a number of transverse ribs in said box and with parallel incisions, one set being inclined relatively to and the other set at right angles to the ribs and extending through the bottom of the box and the base portion of the transverse ribs, said incisions serving for guiding a set of scratching-knives for scratching the surface of the dough and a set of cutting-knives for cutting the dough into smaller pieces.

The invention consists, further, of the combination, with a mold constructed as described, of a scratching and cutting box having a recess for placing the mold in position therein, a longitudinally-reciprocating knife-carrying board guided in said frame, and means for reciprocating said knife-carrying board in said box so as to pass the knives through the incisions located in the bottom of the mold and the base portions of the ribs, respectively, for the scratching and cutting operations; and the invention consists, lastly, of certain details of construction, which will be fully described hereinafter, and defined in the claims.

Figure 4:
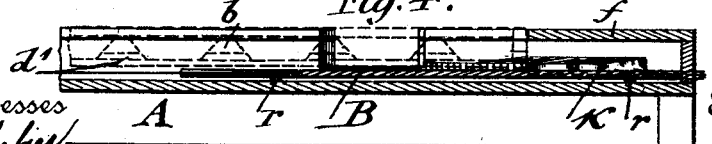

In the accompanying drawings, Figure 1 represents a plan view of my improved mold for making French rolls, showing the mold in position on the scratching-box for producing the scratching of the pieces of dough in the mold. Fig. 2 is a vertical transverse section on line 2 2, Fig. 1. Fig. 3 is a plan view of the scratching-box, partly in horizontal section and with the top boards removed, so as to show the reciprocating knife-carrying frame below the same. Fig. 4 is a longitudinal section on line 4 4, Fig. 3. Fig. 5 is a plan view of the mold placed in position in the cutting-box for producing the cutting of the rolled-out dough into pieces required for the individual rolls. Fig. 6 is a vertical transverse section on line 6 6, Fig. 5. Fig. 7 is a vertical longitudinal section on line 7 7, Fig. 5. Fig. 8 is a top view of a piece of rolled-out dough after the same has been passed through the scratching and cutting boxes. Fig. 9 is a bottom view of Fig. 8, and Fig. 10 shows baked rolls made from a piece of rolled-out dough that has been made by my improved mold.

Similar letters of reference indicate corresponding parts.

Referring to the drawings, A represents a box of suitable size, according to the number and size of the rolls to be made in the same. The box A is made of rectangular shape and provided with raised side and end walls $a$ and with a number of transverse rows of tapered ribs $b$, said ribs being attached to the bottom of the box at such distance from each other that in the spaces between the ribs pieces of rolled or stretched dough of sufficient size may be placed, so as to fill the spaces between the ribs from one end to the other. In the box shown in Figs. 1 and 5 of the drawings seven transverse ribs are shown, which form eight spaces or depressions between the same, so that eight pieces of dough can be placed in the same, each piece being of such a length that five rolls can be made from the same. The mold may, however, be made with a larger or smaller number of ribs and spaces, according to the size of the rolls to be made, or in case the mold is to be used for bread the spaces are made of sufficient width to provide for the long pieces of dough that are required for the so-called "French bread."

The mold is provided at its under side with parallel inclined incisions $d$, which extend through the bottom of the box A and into the base portions of the transverse ribs $b$, the incisions being preferably cut into the mold by a gang of parallel circular saws or in any other suitable manner, the incisions being preferably arranged at an angle of about thirty to thirty-five degrees to the longer sides of the mold, as shown in Figs. 1 and 5. A second set of incisions $d'$ is arranged in the bottom of the box and the base portions of the transverse ribs at right angles to the latter, the number of inclined incisions $d$ being equal to twice the number of the spaces between the ribs, while the number of cross-incisions $d'$ is equal to the number of pieces or blanks minus one into which the rolled-out piece of dough is to be divided. In the mold shown in the drawings twenty-four inclined incisions $d$ and four cross-incisions $d'$ are employed. The series of inclined incisions are intended for the purpose of guiding the scratching-knives by which the face or front of the pieces of dough in the mold is to be scratched, while the cross-incisions are intended for guiding the cutting-knives by which the rolled or stretched out pieces of dough are to be cut into the smaller pieces or blanks required for the rolls.

As soon as the rolled-out pieces of dough are placed into the mold-spaces between the ribs the mold, with the dough in the same, is placed first into a scratching-box F, which is clearly shown in Figs. 1 and 3. The scratching-box F is made of oblong shape and provided with two top boards $f f'$, each having a rectangular recess $f^2$ corresponding to approximately one-half of the mold A. A knife-carrying board B is guided in the box F and provided with rollers $r$, so as to move easily over the bottom of the box F from one end to the other. The knife-carrying board B is provided with a set of twenty-four parallel knives K, which are inserted into recesses of the board B and arranged at the same angle as the recesses $f^2$ of the top boards $f$, so that when the mold is placed in the top of the scratching-box F the knives K of the knife-carrying board B are in exact alinement with the inclined bottom incisions $d$ of the mold. In Fig. 1 the knife-carrying board is shown in normal position in the scratching-box F. It is connected at opposite ends with cords $e\ e'$, of which the cord $e$ is guided over pulleys $e^2\ e^3$ at the end of the box F, the cord $e$ being attached by a helical spring $e^4$ to an eye $e^5$ on the side wall of the box F and provided with a loop-shaped handle $e^6$. The cord $e'$ is guided over a pulley $e^7$ and wound upon a pulley $e^8$, that is located centrally on a transverse shaft S, which is actuated by spiral springs $e^{10}$, located in housings $e^{11}$, the inner ends of said springs being attached to the shaft S, while the outer ends are attached to the housings $e^{11}$, so that when the knife-carrying board B is moved by the cord $e$ from its normal position (shown in Fig. 1) into the position shown in Fig. 3 and its loop-shaped handle $e^6$ placed into position on a hook or pin $e^9$ on the side of the box F the spiral springs $e^{10}$ on the shaft are set to tension. As soon as the handle $e^6$ is released from the hook or pin $e^9$ the tension of the spiral spring $e^{10}$ pulls the knife-carrying board quickly from one end of the box to the other, so that the knives are quickly moved through the inclined incisions $d$ of the mold. The ends of the knives are inclined and of slightly-greater height than their shank portions, as shown in Fig. 4. A scratching action is exerted by the parallel knives of the board B on the pieces of dough located in the spaces of the mold, each piece of dough being scratched at ten points across the under side of the pieces of dough. The helical spring $e^4$ of the cord $e$ serves for holding the cord taut along the side of the scratching-box F, so that the same is always within reach whenever it is desired to place the knife-carrying board into position at the end of the box F and the actuating-springs into tension for performing the scratching operation. By the action of the scratching-knives every one of the forty individual rolls that are obtained from the pieces of dough placed in one frame is provided with two parallel scratches of the same size and inclination, the scratches on all the rolls being exactly alike and produced simultaneously by one forward motion of the knife-carrying board.

As soon as the pieces of dough are scratched on their under side the mold A is transferred to a second or cutting box G, which is made of rectangular shape, but smaller in length than the scratching-box F. The cutting-box G is covered partly by transverse top boards $g$, the recess between said boards being exactly of the same size as the mold. In the cutting-box G is arranged a transverse knife-carrying board B', which is provided with cutting-knives K', having inclined ends arranged transversely to the longer sides of the mold A. Motion is imparted to the knife-carrying board B' in the same manner as to the knife-carrying board B of the scratching-box by spiral springs applied to a transverse shaft S' at the under side of the box, the cords being arranged and actuated in the same manner as the cords of the scratching-box B.

On releasing the cord $e$ from its hook the spiral springs pull the knife-carrying board B' from one end of the frame to the other, so that the inclined portions of the knives pass through the cross-incisions of the mold and cut thereby the pieces of dough placed in the same into smaller pieces or blanks. The inclined ends of the cutting-knives K' on the knife-carrying board B' are made of sufficient height so as to produce the reliable cutting of the pieces of dough in the mold, while the knives of the knife-carrying board B are of smaller height than the knives of the knife-carrying board B' for the reason that they have only to perform a surface-scratching of the rolls.

In place of the cords and pulleys by which the knife-carrying boards are moved from one end of the scratching and cutting boxes to the other any other mechanism may be employed for this purpose, provided that the knife-carrying boards pass quickly over the bottom of the mold, so as to perform the scratching and cutting of the dough in a reliable and effective manner. The knife-carrying board B' is like the board B, provided with rollers $r'$, so that the friction of the knife-carrying board with the bottom of the cutting-box is reduced and the same moved quickly from one end of the box to the other. The boxes are supported on suitable benches sidewise of each other, one mold after the other being placed first into the top recess of the scratching-box for the scratching of the dough, then into the top recess of the cutting-box for cutting the dough into pieces. After both operations are performed a peel is placed over the mold and then both the peel and mold reversed, so that the individual pieces of dough are dropped onto the peel with the scratched surface on top, to be then transferred by the peel into the oven in the usual manner for baking.

The advantages of my improved mold for making French rolls are that the scratching of the face of the dough, which heretofore had to be done by hand for each piece or blank of dough, is accomplished by one operation on all the pieces or blanks in one mold, the cutting operation being performed by a second operation for all the pieces in the mold; secondly, that the scratches on the rolls have all the same inclination and position, so that the rolls have a neater and more uniform appearance, and, lastly, that by my improved mold the small pieces of dough can be made ready for the baking operation within a shorter time than heretofore, so that larger quantities of rolls can be turned out in a given time, and thereby increased quantities be supplied to the consumers at the proper time of the day.

Having thus described my invention, I claim as new and desire to secure by Letters Patent—

1. A mold for making French rolls, consisting of a rectangular box provided with transverse ribs and dough-spaces between said ribs, the bottom of the box and the base portions of the ribs being provided with parallel incisions arranged at a suitable angle of inclination to the longer sides of the box, substantially as set forth.

2. A mold for making French rolls, consisting of a rectangular box provided with transverse ribs and dough-spaces between said ribs, the bottom of the box and the base portions of the ribs being provided with parallel cross-incisions arranged at right angles to the ribs, substantially as set forth.

3. A mold for making French rolls, consisting of a rectangular box provided with transverse ribs and dough-spaces between said ribs, the bottom of the box and the base portions of the ribs being provided with parallel incisions arranged at a suitable angle of inclination to the longer sides of the box, and cross-incisions at right angles to the ribs, substantially as set forth.

4. The combination with a mold provided with transverse ribs and dough-spaces between said ribs and with incisions extending through the bottom of the box, and the base portions of the ribs, of a box, provided with a recess for the mold, a knife-carrying board located in said box and provided with knives arranged in alinement with the bottom incisions of the mold, and means for moving said knife-carrying board in one or the opposite direction in the box, substantially as set forth.

5. The combination, with a mold provided with transverse ribs and dough-spaces between said ribs and parallel incisions extending through the bottom of the box and base portion of the ribs, of a box for said mold provided with top boards and a recess corresponding to the size of the mold between said top boards, a knife-carrying board located in said box and provided with parallel knives arranged in alinement with the incisions in the bottom of the mold, means for moving the knife-carrying board from one end of the box to the other, and means for returning the knife-carrying board to the opposite end of the box, substantially as set forth.

6. The combination, with a mold provided with transverse ribs and dough-spaces between said ribs and incisions extending through the bottom of the box and the base portions of the ribs at a suitable angle of inclination to the longer sides of the box, of a scratching-box provided with top boards and a recess between said boards of the size of the mold, a movable knife-carrying board provided with a number of parallel knives located in said box, and means for moving said knife-carrying board in one or the opposite direction to said box, substantially as set forth.

7. The combination, with a mold provided with transverse ribs and dough-spaces between the ribs and with cross-incisions extending through the bottom of the box and base portions of the ribs at right angles to said ribs, of a cutting-box provided with top boards and a recess corresponding to the size of the mold between said boards, a movable knife-carrying board located in said cutting-box and provided with knives in alinement with said cross-incisions, and means for moving the knife-carrying board in one or the other direction in said box, substantially as set forth.

In testimony that I claim the foregoing as my invention I have signed my name in presence of two subscribing witnesses.

BAPTISTE YCRE.

Witnesses:
PAUL GOEPEL,
HENRY J. SUHRBIER.